United States Patent
Beber et al.

(10) Patent No.: US 8,833,683 B2
(45) Date of Patent: Sep. 16, 2014

(54) FOOD PROCESSOR WITH EXTERNAL CONTROL FOR OPERATING AN ADJUSTABLE CUTTING TOOL

(75) Inventors: Kevin J. Beber, Granger, IN (US); Michael P. Conti, St. Joseph, MI (US); Paul S. Paget, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 201 days.

(21) Appl. No.: 13/414,827

(22) Filed: Mar. 8, 2012

(65) Prior Publication Data
US 2013/0233954 A1 Sep. 12, 2013

(51) Int. Cl.
*B02C 17/02* (2006.01)

(52) U.S. Cl.
USPC .................................. 241/92; 241/286

(58) Field of Classification Search
USPC .............. 241/92, 277, 278.1, 286, 296, 282.1
See application file for complete search history.

(56) References Cited

U.S. PATENT DOCUMENTS

| | | |
|---|---|---|
| 2,189,199 A | 2/1940 | Criner |
| 2,480,717 A | 8/1949 | Dodegge |
| 3,199,860 A | 8/1965 | Moberg |
| 3,623,525 A | 11/1971 | Kieves |
| 3,704,736 A | 12/1972 | Pratley |
| 4,190,208 A | 2/1980 | Schaeffer et al. |
| 4,283,979 A | 8/1981 | Rakocy |
| 4,364,525 A | 12/1982 | McClean |
| 4,369,680 A | 1/1983 | Williams |
| 4,560,111 A | 12/1985 | Cavalli |
| 4,560,113 A * | 12/1985 | Szalanski ................ 241/275 |
| 4,570,519 A | 2/1986 | Motosko |
| 4,624,166 A | 11/1986 | Kreth |
| 4,688,478 A | 8/1987 | Williams |
| 4,733,589 A | 3/1988 | Wolff |
| 4,877,191 A | 10/1989 | Golob et al. |
| 4,878,625 A * | 11/1989 | Newnan .................... 241/37 |
| 4,998,677 A | 3/1991 | Gallaher |
| 5,046,252 A | 9/1991 | Ayuta et al. |

(Continued)

FOREIGN PATENT DOCUMENTS

| | | |
|---|---|---|
| DE | 3644267 A1 | 7/1988 |
| EP | 0100755 A2 | 2/1984 |

(Continued)

OTHER PUBLICATIONS

"Home Cooking in Montana", Product Review . . . Cuisinart Elite 12 Cup Food Processor Model FP-12DC; http:// homecookingmontana.blogspot.com/20-10/03/product-reviewcuisinart-elite-12-cup.html.

(Continued)

*Primary Examiner* — Faye Frances

(57) ABSTRACT

A food processor includes a bowl with a removable lid. Food items are advanced into the bowl through a feed tube formed in the lid where they are cut by a cutting assembly. The cutting assembly is positionable between a plurality of cutting positions to produce cut food items of varying thicknesses. The food processor includes an adjustment assembly operable to move the cutting assembly between the plurality of cutting positions. The adjustment assembly includes a user-operated control device that is secured to the cutting assembly. The user-operated control device extends through a slot defined in the removable lid such that an upper end of the user-operated control device is positioned outside of the processing chamber.

17 Claims, 5 Drawing Sheets

(56) References Cited

U.S. PATENT DOCUMENTS

| | | |
|---|---|---|
| 5,197,681 A | 3/1993 | Liebermann |
| 5,577,430 A | 11/1996 | Gundeson |
| 7,322,112 B2 | 1/2008 | Boerner |
| 7,681,817 B2 | 3/2010 | Orent |
| 7,694,615 B2 | 4/2010 | DiPietro |
| 2006/0075872 A1 | 4/2006 | Wangler |
| 2006/0150791 A1 | 7/2006 | Chase |
| 2007/0044621 A1 | 3/2007 | Rote |
| 2007/0095959 A1 | 5/2007 | Narai et al. |
| 2007/0261523 A1 | 11/2007 | Hussey |
| 2008/0156913 A1 | 7/2008 | Orent |
| 2008/0163768 A1 | 7/2008 | Glucksman |
| 2009/0301319 A1 | 12/2009 | Bigge |
| 2009/0314168 A1 | 12/2009 | Krasznal |
| 2011/0139017 A1 | 6/2011 | Beber |
| 2013/0134245 A1 * | 5/2013 | Gushwa ............... 241/36 |

FOREIGN PATENT DOCUMENTS

| | | |
|---|---|---|
| EP | 0244016 A1 | 11/1987 |
| EP | 2599417 A2 | 6/2013 |
| FR | 2582497 A1 | 12/1986 |
| FR | 2602660 A1 | 2/1988 |
| FR | 2862199 A1 | 5/2005 |
| JP | 01299522 | 4/1989 |
| JP | 01153123 | 5/1989 |
| JP | 04099551 | 3/1992 |
| JP | 04099552 | 3/1992 |
| WO | 0159153 A3 | 8/2001 |
| WO | 03057355 A1 | 7/2003 |
| WO | 2009076585 A1 | 6/2009 |

OTHER PUBLICATIONS

Wolfgang Puck Professional Series 12-Cup Food Processor Use and Care, Jul. 3, 2007, p. 1-23, W. P. Apliances Inc. Model WPMFP20C, Rev 1.0, Downloaded From TSCDIST_FOODPROCMANUAL on Apr. 12, 2010.

European Patent Application No. 13154963.6, Applicant: Whirlpool Corporation, Extended European Search and Examiner's comments dated Jul. 9, 2013.

* cited by examiner

FOOD PROCESSOR WITH EXTERNAL CONTROL FOR OPERATING AN ADJUSTABLE CUTTING TOOL

TECHNICAL FIELD

The present disclosure relates generally to a domestic food processing device, and, more particularly, to a food processing device having a control for adjusting the cutting thickness of the food processing device.

BACKGROUND

A food processing device is a motorized domestic appliance for manipulating (e.g., chopping, slicing, dicing, shredding, grating, or blending) food items. Such an appliance includes a bowl with a removable lid. Food items are inserted into the bowl through a feed tube formed in the lid where they are cut by motor-driven cutting tool and collected in the bottom of the bowl. Some food processors also include an outlet on the bowl that guides the processed food items into an outside bin, container, or other bowl.

Food processors typically come equipped with a number of interchangeable cutting tools for slicing, shredding, or other food processing operations. One common cutting tool is a rotating disk-type cutter. Such a cutting tool includes a rotating disk and a cutting blade that are driven by the motor. The cutting blade is secured to the rotating disk at a location adjacent to an aperture formed in the disk so that processed food items cut by the blade fall through the aperture.

SUMMARY

According to one aspect of the disclosure, a food processing device is disclosed. The food processing device includes a base having a motor positioned therein, a removable bowl coupled to the base, a removable lid coupled to the bowl so as to define a processing chamber. The lid has a feed tube that opens into the bowl. A blade assembly is positioned in the processing chamber and driven by the motor. The blade assembly includes a cutting blade to cut food items advanced through the feed tube. The food processing device also has a rotating disk including an upper surface. The rotating disk is upwardly and downwardly moveable relative to the cutting blade to adjust the distance between the upper surface of the rotating disk and the cutting blade. The food processing device also includes an adjustment assembly operable to move the rotating disk relative to the cutting blade. The adjustment assembly includes a control knob coupled to the blade assembly and positioned above the upper surface of the rotating disk. The control knob has an upper end that extends through a slot defined in the removable lid such that the upper end of the control knob is positioned outside of the processing chamber.

In some embodiments, rotation of the control knob in a first direction may cause upward movement of the rotating disk, and rotation of the control knob in a second direction may cause downward movement of the rotating disk. Additionally, in some embodiments, the rotating disk may include a central hub having a plurality of external threads formed thereon and a planar body extending radially outward from the central hub. The control knob may have a plurality of internal threads that are engaged with the plurality of external threads of the central hub.

In some embodiments, the blade assembly may include a central shaft received in a passageway defined in the central hub of the rotating disk. The central shaft may include a detent. The control knob may include a plurality of teeth that are engaged with the detent of the central shaft to inhibit rotation of the control knob.

In some embodiments, the central shaft may have a track defined in a cylindrical outer surface thereof, and the central hub of the rotating disk may have a key that is positioned in the track defined in the central shaft. Additionally, in some embodiments, the removable lid may include a shell having an inner surface that defines a portion of the processing chamber and an outer surface positioned opposite the inner surface, and a housing extending upwardly from the outer surface of the shell. In some embodiments, the upper end of the control knob may be positioned in the housing.

In some embodiments, the housing may have an access opening defined in an outer cylindrical surface thereof to permit user-access to the control knob. In some embodiments, the removable lid may further include a cover pivotally coupled to the shell. The cover may be movable between a first position in which user-access to the control knob is permitted and a second position in which user-access to the control knob is prevented.

In some embodiments, the food processing device may further include a sensor coupled to the lid. The sensor may be operable to generate an electrical output signal when the cover is in the closed position. The food processing device may also include an electronic controller electrically coupled to the motor and the sensor. The electronic controller may configured be to receive the electrical output signal from the sensor and operate the motor based on the electrical output signal from the sensor.

Additionally, in some embodiments, the housing may include an upper plate and a shaft extending downwardly from the upper plate. The shaft may have a passageway defined therein. The control knob may have an aperture defined in the upper end thereof that receives the shaft of the housing, and an alignment pin may be positioned in the aperture and received in the passageway of the shaft.

According to another aspect, a food processing device includes a base having a motor positioned therein, a removable bowl coupled to the base, and a removable lid coupled to the bowl so as to define a processing chamber. The lid has a feed tube that opens into the bowl. A blade assembly is positioned in the processing chamber and driven by the motor. The blade assembly includes a cutting blade to cut food items advanced through the feed tube. The food processing device has a rotating disk including an externally-threaded hub that is coupled to the blade assembly and a planar body that extends radially outward from the hub. The rotating disk is upwardly and downwardly moveable relative to the cutting blade to adjust the distance between an upper surface of the planar body and the cutting blade. The food processing device also includes an adjustment assembly operable to move the rotating disk relative to the cutting blade. The adjustment assembly includes an internally-threaded control knob engaged with the externally-threaded hub. The control knob has an upper end that is positioned outside of the processing chamber.

In some embodiments, the removable lid may include a shell having an inner surface that defines a portion of the processing chamber and an outer surface positioned opposite the inner surface, and a slot extending through the outer surface and the inner surface. The control knob may extend through the slot of the shell.

In some embodiments, the removable lid may further include a cover pivotally coupled to the shell. The cover may be movable between a first position in which user-access to the control knob is permitted, and a second position in which user-access to the control knob is prevented.

Additionally, the feed tube may extend upwardly from the outer surface of the shell, and the lid may include a housing connected to the feed tube. The upper end of the control knob may be positioned in the housing.

According to another aspect, a food processing device includes a base having a motor positioned therein, a removable bowl coupled to the base, and a removable lid coupled to the bowl so as to define a processing chamber. The lid has a feed tube that opens into the bowl. An adjustable cutting tool assembly is positioned in the processing chamber and driven by the motor to cut food items advanced through the feed tube. The adjustable cutting tool assembly includes a cutting tool that is positionable between a plurality of cutting positions to produce cut food items of varying thicknesses and an adjustment mechanism operable to move the cutting tool between the plurality of cutting positions. The adjustment mechanism comprises a user-operated control device that is secured to the cutting tool. The user-operated control device extends through a slot defined in the removable lid such that an upper end of the user-operated control device is positioned outside of the processing chamber.

In some embodiments, the removable lid may include a shell having an inner surface that defines a portion of the processing chamber and an outer surface positioned opposite the inner surface, and a housing extending upwardly from the outer surface of the shell. The upper end of the user-operated control device may be positioned in the housing.

In some embodiments, the user-operated control device may include a control knob having a grip positioned in the housing. Additionally, in some embodiments, the control knob may include an internally-threaded body, and the cutting tool may include an externally-threaded rotating disk that is engaged with the internally-threaded body of the control knob.

In some embodiments, the cutting tool may further include a cutting blade and a rotating disk that is moveable relative to the cutting blade. The adjustment mechanism may be operable to change a distance defined between the cutting blade and an upper surface of the rotating disk.

In some embodiments, the adjustment assembly may be operable to move the rotating disk relative to the cutting blade.

BRIEF DESCRIPTION OF THE DRAWINGS

The detailed description particularly refers to the following figures, in which.

DETAILED DESCRIPTION OF THE DRAWINGS

Figure 1:
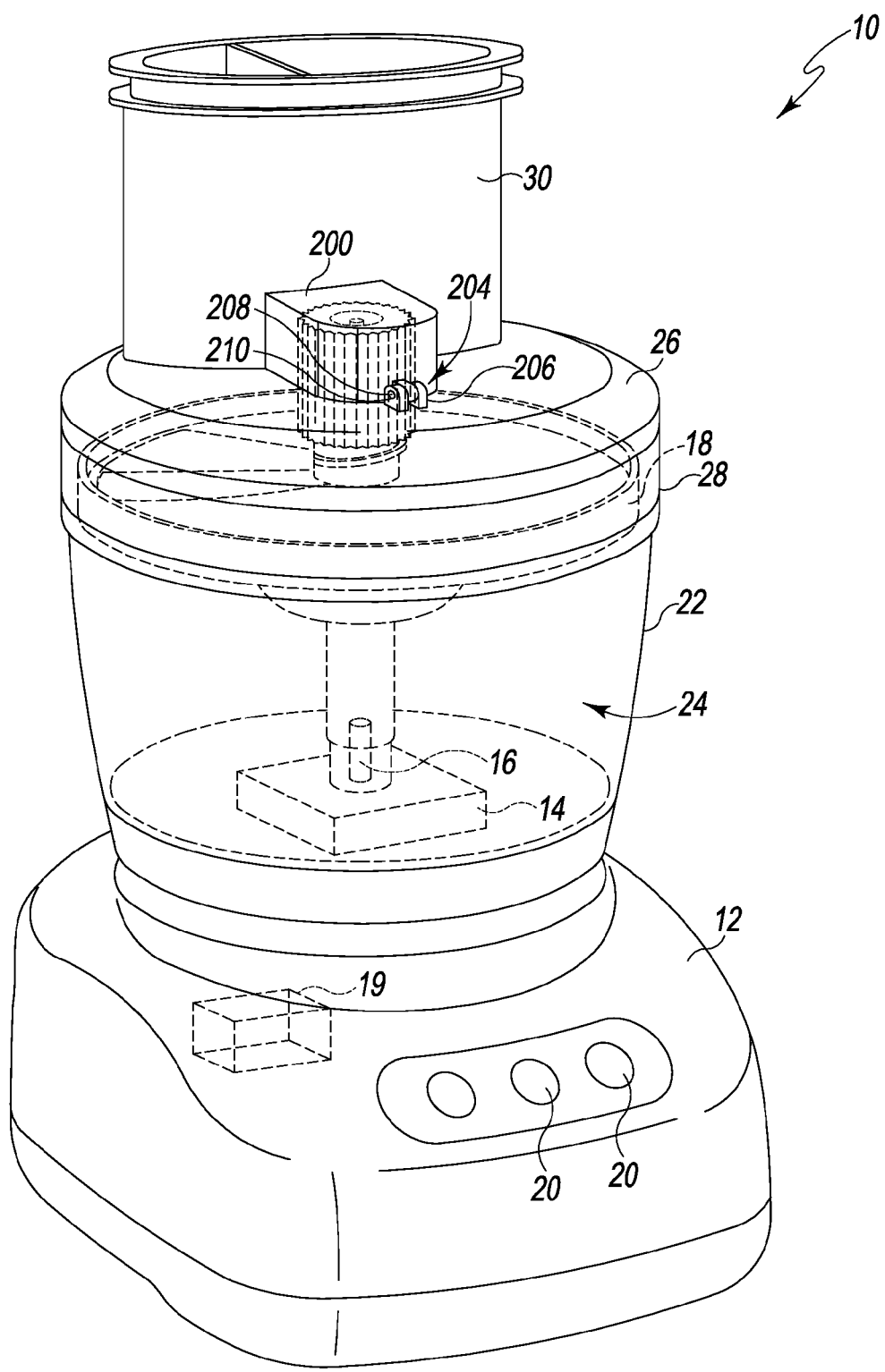
FIG. 1 is a perspective view of a food processing device.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

Referring now to FIG. 1, a food processing device or food processor 10 is shown. The food processor 10 has a base 12 that houses a motor 14 and a control unit 19. Under the control of the control unit, the motor's output shaft 16 drives an adjustable cutting tool 18 to cut food items such as cheeses, meats, fruits, and vegetables. The base 12 also includes a plurality of controls 20, such as, for example, buttons, switches, dials, or other types of controls. The controls 20, like the motor 14, are electrically coupled to the control unit 19. A user operates the controls 20 to control the operation of the motor 14 and hence the food processor 10. For instance, one of the controls 20 may be operable to turn the motor 14 on and off, while another control 20 may change the motor's speed.

As will be understood by those skilled in the art, the control unit 19 may comprise analog and/or digital circuitry to process electrical signals received from the motor 14 (or other components of the food processor 10) and provide electrical control signals to the motor or other components of the food processor 10. For example, the control unit 19 may be embodied as a microcontroller that executes firmware routines to control the operation of the food processor 10.

A removable bowl 22 is secured to the base 12. The bowl's handle (not shown) facilitates placement of the bowl 22 on the base 12. The food processor 10 also includes a removable lid 26 that is secured to the upper peripheral edge 28 of the bowl 22. The lid 26 has a feed tube 30 formed therein through which food items such as fruits and vegetables are inserted into the bowl 22 to be processed by the food processor 10. As described in greater detail below, the lid 26 and the bowl 22 cooperate to define a processing chamber 24 where food items are processed by the cutting tool 18.

The bowl 22, the lid 26, and the feed tube 30 are generally made of a transparent or translucent material, so that the contents of the food processor 10 can be viewed by a user without removing the lid 26 from the bowl 22. Moreover, one or more locking mechanisms may be used to lock the bowl to the base 12 and the lid 26 to the bowl 22.

Figure 2:
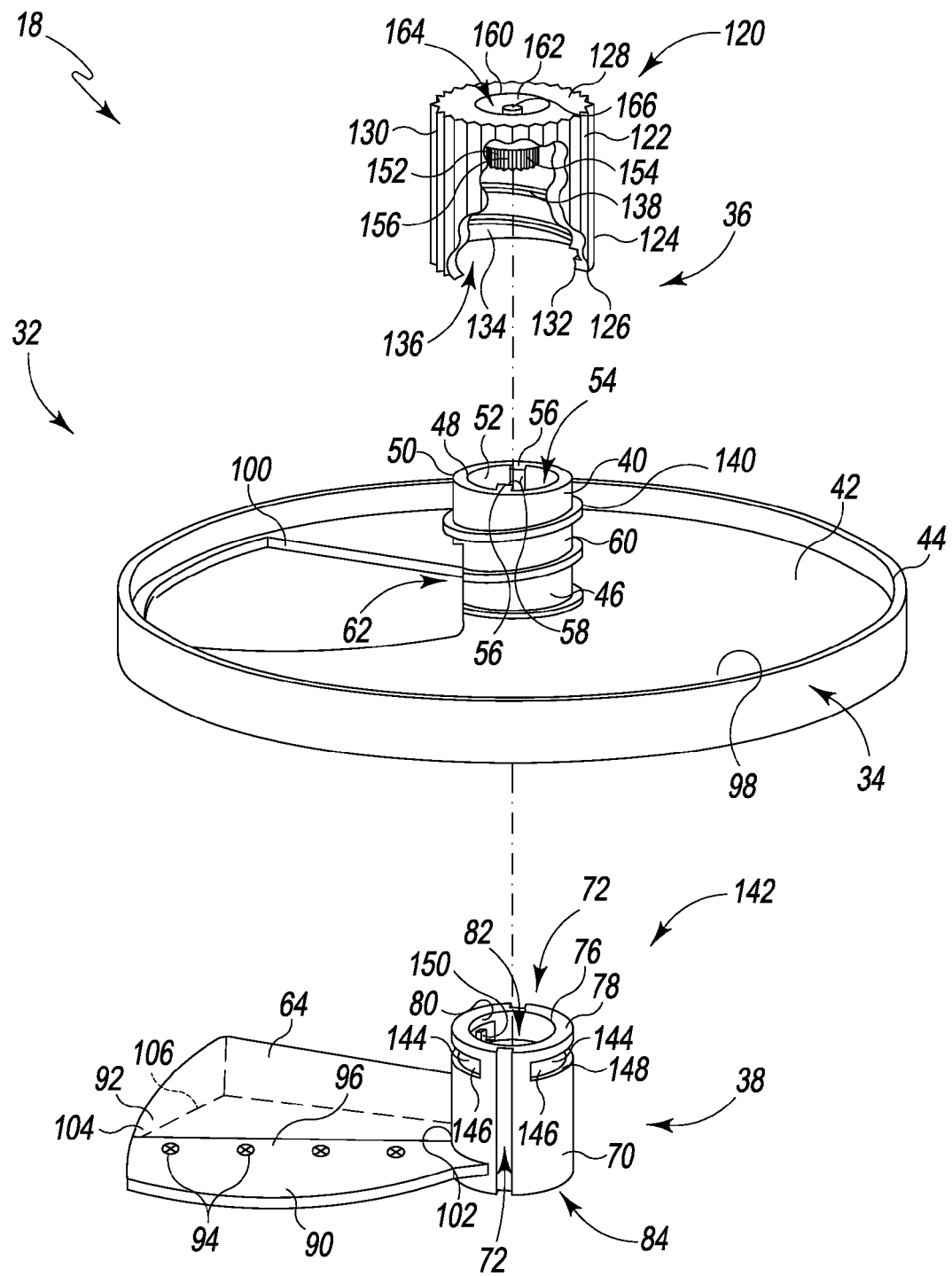
FIG. 2 is an exploded perspective view of an adjustable cutting tool of the food processing device of FIG. 1.
Figure 4:
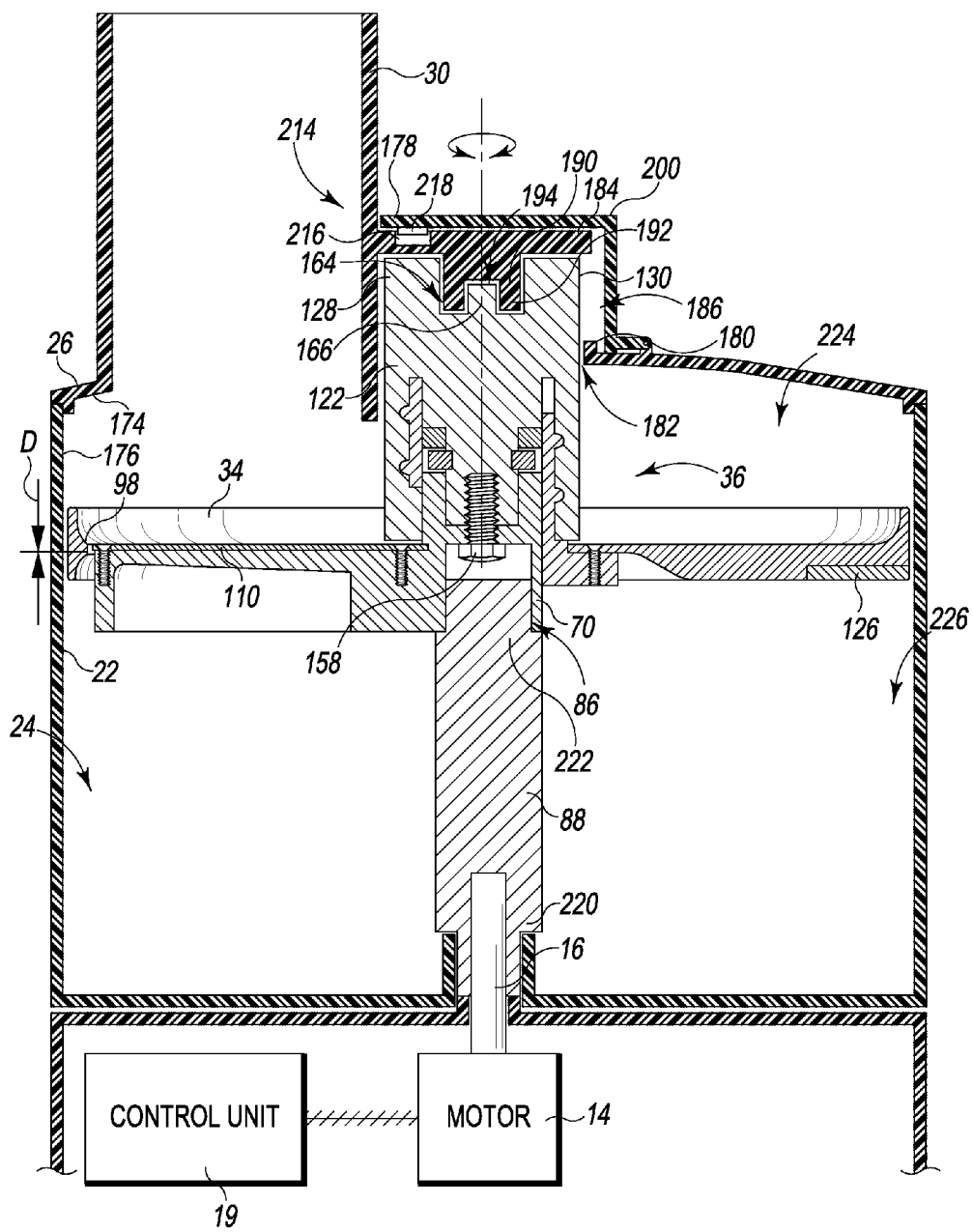
FIG. 4 is a partial cross-sectional view of the food processing device of FIG. 1 showing the adjustable cutting tool in one cutting position.
Figure 5:
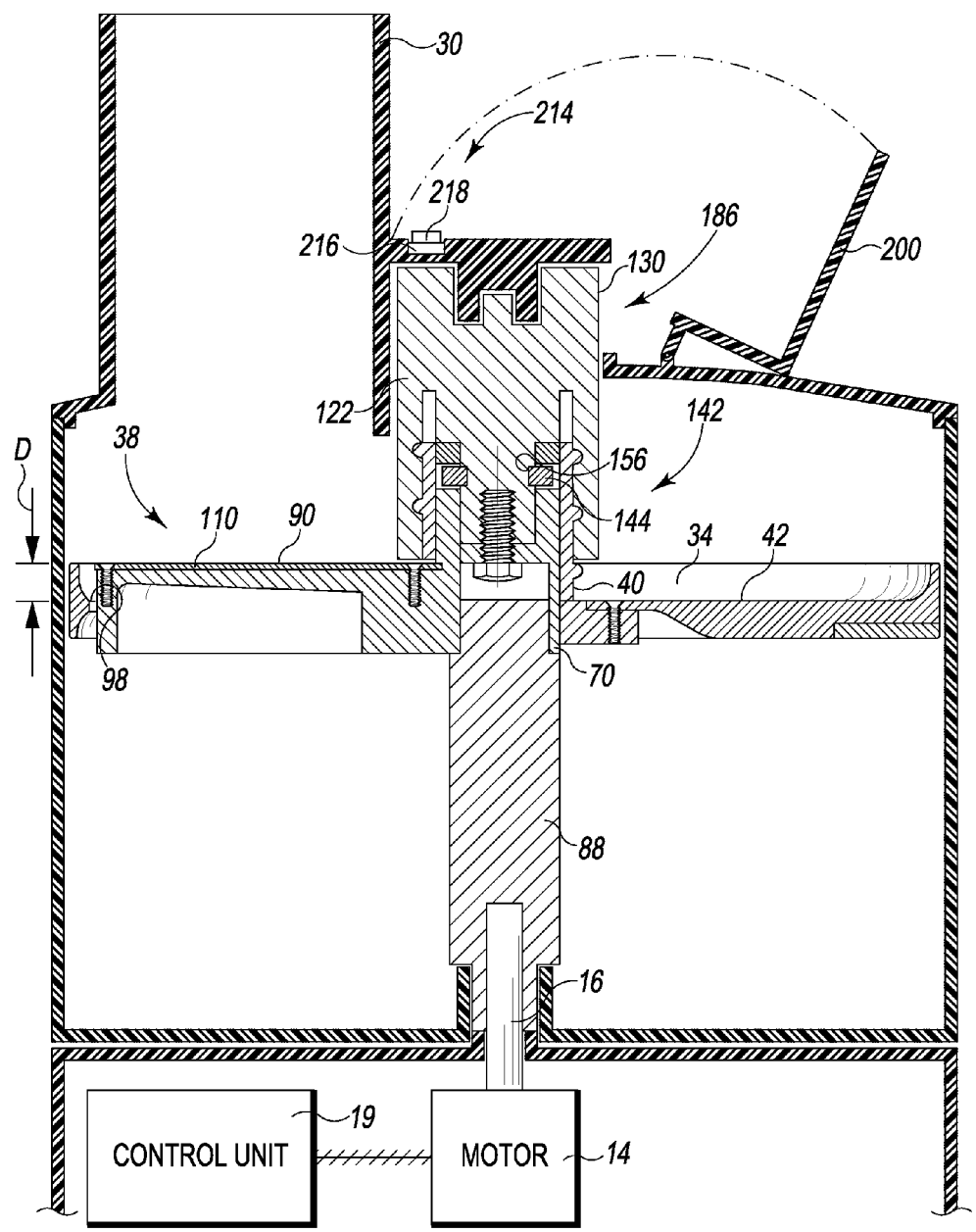
FIG. 5 is a view similar to FIG. 4 showing the adjustable cutting tool in another cutting position.

Referring now to FIG. 2, the adjustable cutting tool 18 is illustratively embodied as an adjustable cutting disk assembly 32. The assembly 32 includes a rotating disk 34, a thickness adjustment device 36, and a cutting blade assembly 38. The rotating disk 34 includes a central hub 40, a planar body 42 that extends radially outward from the central hub 40, and a rim 44 that extends vertically from the outer perimeter of the planar body 42. The rotating disk 34 has a diameter that is slightly less than the inner diameter of the bowl 22. As such, the rim 44 is positioned adjacent to, but spaced slightly apart from, the inner wall of the bowl to permit rotation of the disk 34 within the bowl 22, as shown in FIGS. 4 and 5. In the exemplary embodiment described herein, the rotating disk 34 is embodied as a monolithic structure (e.g., a single molded or cast part). However, it should be appreciated that the components of the rotating disk 34 (e.g., the hub 40, the body 42, and the rim 44) may be embodied as separate components secured to one another by an adhesive or other suitable fastener.

The central hub 40 of the rotating disk 34 includes a hollow sleeve 46 that extends upwardly from the planar body 42. The hollow sleeve 46 has an opening 48 defined in an upper end 50 thereof, and a cylindrical inner wall 52 extends downwardly from the opening 48 to define a passageway 54 through the sleeve 46. The central hub 40 also includes a pair of keys 56 that are positioned in the passageway 54. The keys 56 are illustratively embodied as a pair of longitudinal ribs 58 that extend inwardly from the inner wall 52.

As shown in FIG. 2, the hollow sleeve 46 has a cylindrical outer surface 60. The central hub 40 includes a slot 62 that extends inwardly from the outer surface 60. The slot 62 is connected to the passageway 54 of the hollow sleeve 46 and is sized to receive a mounting arm 64 of the blade assembly 38.

The blade assembly 38 includes a central shaft 70 that is received in the passageway 54 of the hollow sleeve 46. A pair of channels 72 are defined in an outer surface 74 of the central shaft 70, and each channel 72 is sized to receive one of the ribs 58 extending inwardly from the inner wall 52 of the hollow sleeve 46. The central shaft 70 has an opening 76 defined in an upper end 78 thereof, and an inner wall 80 extends inwardly from the opening 76 to define an aperture 82 in the central shaft 70. As shown in FIG. 4, the lower end 84 of the central shaft 70 has a socket 86 defined therein, which is configured to engage a drive stem 88 of the food processor 10, as described in greater detail below.

The blade assembly 38 also includes a mounting arm 64 that extends outwardly from the lower end 84 of the central shaft 70. In the illustrative embodiment, the central shaft 70 and mounting arm 64 are formed as a single monolithic component from a plastic or metallic material. It should be appreciated that in other embodiments the shaft 70 and arm 64 may be formed as separate components that are joined during final assembly by an adhesive or other suitable fastener.

The blade assembly 38 also includes a cutting blade 90, which is secured to an upper surface 92 of the mounting arm 64. A number of fasteners 94 (i.e., screws) positioned at a rear edge 96 of the cutting blade 90 extend into the mounting arm 64, thereby rigidly securing the cutting blade 90 to the mounting arm 64. It will be appreciated that in other embodiments the fasteners 94 may take the form of T-stakes, pins, posts, or other structures capable of securing the cutting blade 90 to the mounting arm 64. Additionally, the mounting arm 64 may include an overmold that receives the cutting blade 90. It should also be appreciated that in other embodiments the cutting blade 90 and mounting arm 64 may be formed as a single monolithic component from a plastic or metallic material.

As shown in FIG. 2, the planar body 42 of the rotating disk 34 has a substantially planar upper surface 98 and an opening 100 defined in the upper surface 98. The opening 100 extends radially outward from the central hub 40 and is sized to receive the mounting arm 64 and the cutting blade 90. The mounting arm 64 extends from an inner end 102, which is secured to the lower end 84 of the central shaft 70, to an outer end 104, which is positioned adjacent to the rim 44 of the rotating disk 34. The blade assembly 38 includes a ramp 106 that is defined in the mounting arm 64 to guide food items cut by the cutting blade 90. As shown in FIG. 2, the ramp 106 is positioned adjacent to and below the cutting blade 90 and includes an inclined surface (not shown) extending downwardly from the underside of cutting blade 90.

As described above, the cutting tool 18 also includes a thickness adjustment device 36. The thickness adjustment device 36 is operable by a user to vary the cutting thickness of the food processor 10 thereby creating thicker or thinner pieces of cut food items. To do so, the thickness adjustment device 36 moves the rotating disk 34 relative to the cutting blade 90 to vary the distance defined between the cutting edge 110 of the cutting blade 90 and the upper surface 98 of the rotating disk 34. The thickness adjustment device 36 includes a user-operated control device 120 that is operable to move the rotating disk 34 relative to the cutting blade 90.

In the illustrative embodiment, the user-operated control device 120 is positioned above the upper surface 98 of the rotating disk 34. As shown in FIG. 2, the user-operated control device 120 includes a control knob 122. The control knob 122 has a body 124 that extends from a lower end 126 to an upper end 128. The body 124 includes a knurled grip 130. It should be appreciated that other user-activated control devices, such as levers, dials, buttons, or the like, may be substituted for the control knob.

As shown in FIG. 2, the body 124 of the control knob 122 has an opening 132 defined in the lower end 126 thereof. An inner wall 134 extends upwardly from the opening 132 to define an aperture 136 in the control knob 122. The aperture 136 receives the hollow sleeve 46 of the rotating disk 34. The inner wall 134 has a plurality of internal threads 138 defined therein, and the outer surface 60 of the sleeve 46 has a plurality of external threads 140 formed thereon that correspond to the internal threads 138 of the control knob 122. The internal threads 138 of the control knob 122 engage the external threads 140 of the sleeve 46 to move the sleeve 46 (and hence the rotating disk 34) upwardly and downwardly when the control knob 122 is rotated, as described in greater detail below.

The thickness adjustment device 36 also includes a locking mechanism 142 configured to inhibit rotation of the control knob 122. In the illustrative embodiment, the locking mechanism 142 includes a pair of detents 144 attached to the central shaft 70 of the blade assembly 38. As shown in FIG. 2, each detent 144 includes an arm 146 positioned in a slot 148 defined in the central shaft 70 and a tab 150 extending from each arm 146 into the aperture 82 of the central shaft 70. The locking mechanism 142 also includes a rod 152 coupled to the body 124 of the control knob 122 that has a lower end 154 positioned in the aperture 136 defined in the control knob 122. The rod 152 is sized to be received in the aperture 82 of the central shaft 70, and the rod 152 has a plurality of teeth 156 formed thereon that are configured to be engaged by the tabs 150 of the detents 144 to inhibit rotation of the control knob 122.

The control knob 122 is coupled to the blade assembly 38 via a fastener 158. As shown in FIG. 4, the fastener 158 extends through a bore defined in the central shaft 70 of the blade assembly 38 and is received in an aperture defined in the rod 152 of the control knob 122. In the illustrative embodiment, the fastener is a screw. It should be appreciated that in other embodiments the fastener may be a bolt, snap feature, or the like.

The control knob 122 has an opening 160 defined in the upper end 128 of the body 124. An inner wall 162 extends inwardly from the opening 160 to a bottom surface (not shown) to define an aperture 164 in the upper end 128 of the body 124. As shown in FIG. 2, a cylindrical pin 166 extends upwardly from the bottom surface.

Figure 3:
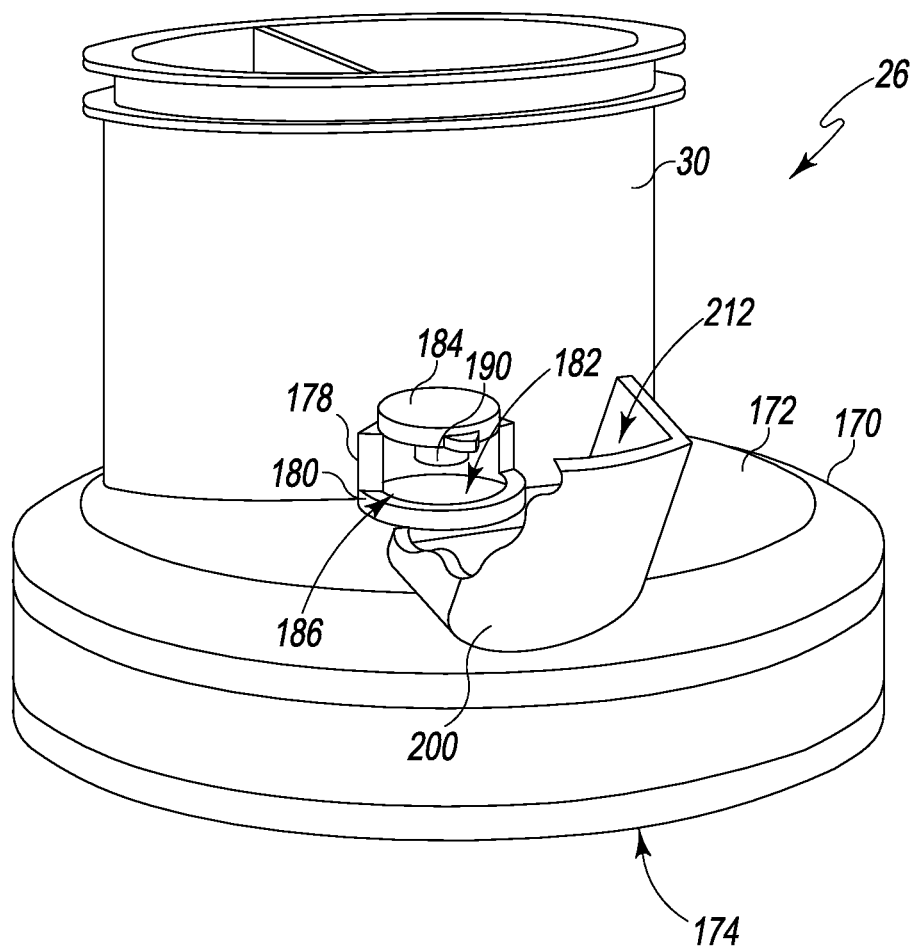
FIG. 3 is a perspective view of the removable lid of the food processing device of FIG. 1.

Referring now to FIG. 3, the removable lid 26 includes a shell 170 having an outer surface 172 and an inner surface 174 positioned opposite the outer surface 172. As described in greater detail below, the inner surface 174 of the lid 26 cooperates with an inner surface 176 of the bowl 22 to define the processing chamber 24. The feed tube 30 of the removable lid 26 extends upwardly from the outer surface 172 of the shell 170, and the removable lid 26 also includes a housing 178 that extends upwardly from the outer surface 172.

The housing 178 of the removable lid 26 includes an outer wall 180 that extends upwardly from the outer surface 172. As shown in FIG. 3, the outer wall 180 encloses a cylindrical slot 182 that extends through the surfaces 172, 174 of the lid 26. The slot 182 is sized to receive the upper end 128 of the control knob 122, as described in greater detail below. The removable lid 26 of the food processor 10 also includes an upper plate 184 that extends outwardly from the feed tube 30. As shown in FIG. 2, the upper plate 184 is spaced apart from the outer wall 180 such that an access opening 186 is defined between the plate 184 and the wall 180. As used herein, the term "access opening" is intended to mean the opening formed in the side of the housing through which a user may gain access to the control knob of the cutting tool, for example, change the cutting thickness of the cutting tool.

The housing 178 includes a shaft 190 that extends downwardly from the upper plate 184 to a lower end 192. As shown in FIG. 4, an aperture 194 is defined in the lower end 192 of the shaft 190. The lower end 192 of the shaft 190 is sized to be received in the aperture 164 in the upper end 128 of the control knob 122. Similarly, the aperture 194 of the shaft 190 is sized to receive the cylindrical pin 166 of the control knob 122.

The removable lid 26 also includes a cover 200 configured to be positioned over the housing 178 and hence the access opening 186. As shown in FIG. 1, the cover 200 is pivotally coupled to the shell 170 via a pair of pivot joints 204. Each pivot joint 204 includes a mounting bracket 206 extending upwardly from the outer surface 172 of the shell 170 and a cylindrical pin 208 extending through a plurality of holes 210 defined in the bracket 206 and the cover 200. In that way, the cover 200 is attached to the shell 170. As shown in FIG. 3, the cover 200 defines a cavity 212 sized to receive the housing 178. When the cover 200 is in the open position shown in FIG. 3, user-access to the access opening 186 is permitted. When the cover 200 is in the closed position shown in FIG. 1, user-access to the access opening 186 is prevented.

It should be appreciated that in other embodiments the cover may be configured to be detached from the shell 170. For example, cover may be embodied as a bracket configured to be positioned between the upper plate 184 and the outer wall 180 of the housing 178. It should also be appreciated that in other embodiments the housing may be omitted. In such embodiments, the cover may be positioned over the upper end 128 of the control knob 122 and the cylindrical slot 182.

As shown in FIGS. 4 and 5, the food processor 10 also includes a sensor 214 positioned in the lid 26. The sensor 214 includes a base 216 and a button 218 configured to move relative to the base 216. The sensor 214 is electrically-coupled to the control unit 19 when the lid 26 and the bowl 22 are secured to the food processor base 12, and the sensor 214 is operable to generate an electrical output signal based on the position of the button 218. In the illustrative embodiment, when the cover 200 is in the closed position shown in FIG. 4, the button 218 is moved to an engaged position, and the sensor 214 generates an electrical output signal indicating the same. When the cover 200 is in the open position shown in FIG. 5, the button 218 is moved to a disengaged position, and no output signal is generated.

The control unit 19 is configured to receive the electrical output signal from the sensor 214. When the signal is present, the control unit 19 permits the activation of the motor 14. When the signal is not present, the control unit 19 prevents the activation of the motor 14. It should be appreciated that in other embodiments the sensor may be any type of reed switch, curtain switch, plum switch, pressure switch, or any other type of electrical or mechanical switch operable to detect when the cover 200 is in the closed position.

As shown in FIGS. 4 and 5, the output shaft 16 of the motor 14 is coupled to a lower end 220 of the drive stem 88 when the food processor 10 is assembled. The upper end 222 of the drive stem 88 is in turn received in the socket 86 defined in the blade assembly 38. In that way, the adjustable cutting tool 18 is coupled to the output shaft 16 such that the adjustable cutting tool 18 may be driven by the motor 14. As shown in FIG. 4, the rotating disk 34 effectively divides the processing chamber 24 into an upper compartment 224 located between the disk 34 and the lid 26 and a lower compartment 226 located underneath the disk 34. The control knob 122 of the thickness adjustment assembly 36 extends outwardly from the upper compartment 224 of the processing chamber 24 through the cylindrical slot 182. The grip 130 of the control knob 122 is positioned in the housing 178 and is accessible through the access opening 186.

A vertical distance, D, between the cutting edge 110 of the cutting blade 90 and the upper surface 98 of the rotating disk 34 defines a cutting thickness. In other words, the thickness of the pieces of food items cut by the food processor 10 is determined by the distance D between the cutting edge 110 of the cutting blade 90 and the upper surface 98 of the rotating disk 34. As the distance D between the cutting edge 110 of the cutting blade 90 and the upper surface 98 of the rotating disk 34 increases, thicker pieces of food items are created, with thinner pieces of food items being created when the distance D between the cutting edge 110 and the upper surface 98 decreases.

During operation, the user may change the cutting thickness using the control knob 122. To do so, the user may pivot the cover 200 from the closed position shown in FIG. 4 to the open position shown in FIG. 5. The user may then grasp the grip 130 of the control knob 122 and apply a rotational force thereto. When sufficient force is applied, the detent 144 is disengaged from the teeth 156 of the locking mechanism 142, thereby permitting rotation of the control knob 122. When the control knob 122 is rotated, the hub 40 of the rotating disk 34 translates upwardly and downwardly along the central shaft 70 of the blade assembly 38 to change the thickness of the food items being processed by the food processor 10. In particular, counter-clockwise rotation of the control knob 122 causes downward movement of the hub 40 (and hence rotating disk 34), which increases the distance D between the cutting edge 110 of the cutting blade 90 and the upper surface 98 of the rotating disk 34 and thereby produces thicker pieces of food items. Oppositely, when the control knob 122 is rotated clockwise, the hub 40 is moved upwardly along the central shaft 70 and the distance D between the cutting edge 110 of the cutting blade 90 and the upper surface 98 of the rotating disk 34 is decreased, thereby producing thinner pieces of food items.

As shown in FIG. 4, the user-operated control device 120 (i.e., the control knob 122) extends outwardly from the processing chamber 24 through the cylindrical slot 182 defined in the lid 26. In particular, the upper end 128 of the control knob 122, including the grip 130, is positioned outside of the processing chamber 24 defined by the bowl 22 and the lid 26. What is meant herein by the term "outside" as it relates to the location of the user-activated control device relative to the bowl or the processing chamber is that the structure of the control device contacted by the user to operate the device is positioned external to the bowl and lid so that it may be operated by the user while the lid is secured to the bowl, thereby allowing the cutting thickness of the food processor to be adjusted without removing the lid from the bowl. In the illustrative embodiment, the user may grasp the grip 130 to rotate the control knob 122 to change the cutting thickness of the food processor without removing the lid from the bowl. As described above, it should be appreciated that other user-activated control devices, such as levers, dials, buttons, or the like, may be substituted for the control knob.

After setting the cutting thickness, the user may close the cover 200 to seal the access opening 186. The user may then operate the controls 20 to activate the motor 14 and process food items.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

For example, while rotating disk is shown as movable relative to the cutting blade, in other embodiments the cutting blade may be configured to move relative to the rotating disk. Additionally, while the cutting tool 18 is illustrated herein as an adjustable cutting disk assembly, it should be appreciated that in other embodiments the cutting tool may be an adjustable shredder, an adjustable ice shaver, or other adjustable cutting device. Further, while the food processor 10 is herein illustrated as a conventional domestic food processor, the features and aspects disclosed herein can also be implemented in other types of food processing devices such as automatic food slicers, dicers, ice shavers and the like.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure.

The invention claimed is:

1. A food processing device comprising:
a base having a motor positioned therein,
a removable bowl coupled to the base,
a removable lid coupled to the bowl so as to define a processing chamber, the lid having a feed tube that opens into the bowl and an access opening,
a blade assembly positioned in the processing chamber and driven by the motor, the blade assembly including a cutting blade to cut food items advanced through the feed tube,
a rotating disk including an upper surface, the rotating disk being upwardly and downwardly moveable relative to the cutting blade to adjust the distance between the upper surface of the rotating disk and the cutting blade, and
an adjustment assembly operable to move the rotating disk relative to the cutting blade, wherein (i) the adjustment assembly includes a control knob coupled to the blade assembly and positioned above the upper surface of the rotating disk, and (ii) the control knob has an upper end that extends through the access opening in the removable lid such that the upper end of the control knob is positioned outside of the processing chamber,
wherein the removable lid includes (i) a shell having an inner surface that defines a portion of the processing chamber and an outer surface positioned opposite the inner surface, and (ii) a housing extending upwardly from the outer surface of the shell, and the upper end of the control knob is positioned in the housing; and
wherein the removable lid further includes a cover pivotally coupled to the shell, the cover being movable between (i) a first position in which user-access to the control knob is permitted, and (ii) a second position in which user-access to the control knob is prevented.

2. The food processing device of claim 1, wherein:
rotation of the control knob in a first direction causes upward movement of the rotating disk, and
rotation of the control knob in a second direction causes downward movement of the rotating disk.

3. The food processing device of claim 2, wherein:
the rotating disk includes (i) a central hub having a plurality of external threads formed thereon, and (ii) a planar body extending radially outward from the central hub, and
the control knob has a plurality of internal threads that are engaged with the plurality of external threads of the central hub.

4. The food processing device of claim 3, wherein:
the blade assembly includes a central shaft received in a passageway defined in the central hub of the rotating disk, the central shaft including a detent, and
the control knob includes a plurality of teeth that are engaged with the detent of the central shaft to inhibit rotation of the control knob.

5. The food processing device of claim 4, wherein the central shaft has a track defined in a cylindrical outer surface thereof, and the central hub of the rotating disk has a key that is positioned in the track defined in the central shaft.

6. The food processing device of claim 1, wherein the food processing device further comprises:
a sensor coupled to the lid, the sensor being operable to generate an electrical output signal when the cover is in the second position, and
an electronic controller electrically coupled to the motor and the sensor,
wherein the electronic controller is configured to (i) receive the electrical output signal from the sensor, and (ii) operate the motor based on the electrical output signal from the sensor.

7. The food processing device of claim 1, wherein:
the housing includes an upper plate and a shaft extending downwardly from the upper plate, the shaft having a passageway defined therein, and
the control knob has (i) an aperture defined in the upper end thereof that receives the shaft of the housing, and (ii) an alignment pin that is positioned in the aperture and received in the passageway of the shaft.

8. A food processing device comprising:
a base having a motor positioned therein,
a removable bowl coupled to the base,
a removable lid coupled to the bowl so as to define a processing chamber, the lid having a feed tube that opens into the bowl, and comprising a first position where the removable lid is removed from the bowl and a second position where the removable lid is attached to the bowl,
a blade assembly positioned in the processing chamber and driven by the motor, the blade assembly including a cutting blade to cut food items advanced through the feed tube,
a rotating disk including an externally-threaded hub that is coupled to the blade assembly and a planar body that extends radially outward from the hub, the rotating disk being upwardly and downwardly moveable relative to the cutting blade to adjust the distance between an upper surface of the planar body and the cutting blade, and
an adjustment assembly operable to move the rotating disk relative to the cutting blade, wherein the adjustment assembly includes an internally-threaded control knob engaged with the externally-threaded hub, the control knob having an upper end that is positioned outside of the processing chamber, wherein when the removable lid is in the second position, the removable lid comprises a first state where the adjustment assembly is accessible and a second state where the adjustment assembly is not accessible.

9. The food processing device of claim 8, wherein:

the removable lid includes (i) a shell having an inner surface that defines a portion of the processing chamber and an outer surface positioned opposite the inner surface, and (ii) a slot extending through the outer surface and the inner surface, and the control knob extends through the slot of the shell.

10. The food processing device of claim 9, wherein the removable lid further includes a cover pivotally coupled to the shell, the cover being movable between (i) a first position in which user-access to the control knob is permitted, and (ii) a second position in which user-access to the control knob is prevented.

11. The food processing device of claim 9, wherein:

the feed tube extends upwardly from the outer surface of the shell, the lid includes a housing connected to the feed tube, and the upper end of the control knob is positioned in the housing.

12. A food processing device, comprising:

a base having a motor positioned therein, a removable bowl coupled to the base, a removable lid coupled to the bowl so as to define a processing chamber, the lid having a feed tube that opens into the bowl, and an adjustable cutting tool assembly positioned in the processing chamber and driven by the motor to cut food items advanced through the feed tube, the adjustable cutting tool assembly comprising:

a cutting tool that is positionable between a plurality of cutting positions to produce cut food items of varying thicknesses, and an adjustment mechanism operable to move the cutting tool between the plurality of cutting positions, the adjustment mechanism comprising a user-operated control device that is secured to the cutting tool, wherein the user-operated control device extends through a slot defined in the removable lid such that an upper end of the user-operated control device is positioned outside of the processing chamber, and is accessible to a user when the removable lid is on the bowl, and a rotatable adjustment cover, wherein the user-operated control device is accessible to the user when the rotatable adjustment cover is in a first position, and the user-operated control device is not accessible when the rotatable adjustment cover is in a second position.

13. The food processing device of claim 12, wherein:

the removable lid includes (i) a shell having an inner surface that defines a portion of the processing chamber and an outer surface positioned opposite the inner surface, (ii) a housing extending upwardly from the outer surface of the shell, and the upper end of the user-operated control device is positioned in the housing.

14. The food processing device of claim 13, wherein the user-operated control device comprises a control knob having a grip positioned in the housing.

15. The food processing device of claim 14, wherein:

the control knob includes an internally-threaded body, and the cutting tool includes an externally-threaded rotating disk that is engaged with the internally-threaded body of the control knob.

16. The food processing device of claim 15, wherein:

the cutting tool further includes a cutting blade and a rotating disk that is moveable relative to the cutting blade, and the adjustment mechanism is operable to change a distance defined between the cutting blade and an upper surface of the rotating disk.

17. The food processing device of claim 16, wherein the adjustment mechanism is operable to move the rotating disk relative to the cutting blade.

\* \* \* \* \*